(12) United States Patent
Ma et al.

(10) Patent No.: US 11,016,210 B2
(45) Date of Patent: May 25, 2021

(54) STIMULATED FRACTURE NETWORK PARTITIONING FROM MICROSEISMICITY ANALYSIS

(71) Applicant: Halliburton Energy Services, Inc., Houston, TX (US)

(72) Inventors: Jianfu Ma, Pearland, TX (US); Jie Bai, Katy, TX (US); Ken Huang, Sugarland, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 560 days.

(21) Appl. No.: 15/763,109

(22) PCT Filed: Nov. 19, 2015

(86) PCT No.: PCT/US2015/061580
§ 371 (c)(1),
(2) Date: Mar. 24, 2018

(87) PCT Pub. No.: WO2017/086975
PCT Pub. Date: May 26, 2017

(65) Prior Publication Data
US 2018/0275301 A1    Sep. 27, 2018

(51) Int. Cl.
*G01V 1/30* (2006.01)
*G01V 1/28* (2006.01)
(Continued)

(52) U.S. Cl.
CPC ............ *G01V 1/288* (2013.01); *E21B 49/006* (2013.01); *G01V 1/003* (2013.01); *G01V 1/345* (2013.01);
(Continued)

(58) Field of Classification Search
CPC ........ G01V 1/288; G01V 1/003; G01V 1/345; G01V 2210/1234; G01V 2210/646; G01V 2210/665; E21B 49/006
See application file for complete search history.

(56) References Cited

U.S. PATENT DOCUMENTS 9,529,103 B2 * 12/2016 Ma ........................... G01V 1/30
9,903,189 B2 *  2/2018 Ma ........................... E21B 43/26
(Continued)

FOREIGN PATENT DOCUMENTS

WO    2014110542 A1    7/2014
WO    2017086975 A1    5/2017

*Primary Examiner* — Krystine E Breier
(74) *Attorney, Agent, or Firm* — John W. Wustenberg; Parker Justiss, P.C.

(57) ABSTRACT

An illustrative hydraulic fracture mapping method includes: collecting microseismic signals during a multistage hydraulic fracturing operation; deriving microseismic event locations from the microseismic signals to create a microseismic event map for each stage of the operation; fitting a set of fracture planes to the microseismic event maps; determining a stimulated reservoir volume ("SRV") region for each said stage; identifying where SRV regions overlap to form an overlap region; partitioning the overlap region to eliminate any overlap between the SRV regions; truncating the set of fracture planes for the SRV regions to discard any portion outside the revised SRV regions; and storing or displaying the truncated set of fracture planes for the first revised SRV region.

20 Claims, 5 Drawing Sheets

(51) Int. Cl.
   *E21B 49/00* (2006.01)
   *G01V 1/00* (2006.01)
   *G01V 1/34* (2006.01)

(52) U.S. Cl.
   CPC ............... *G01V 2210/1234* (2013.01); *G01V 2210/646* (2013.01); *G01V 2210/665* (2013.01)

(56) References Cited

U.S. PATENT DOCUMENTS

| | | |
|---|---|---|
| 10,408,957 B2* | 9/2019 | Ma .................. E21B 33/068 |
| 10,527,744 B2* | 1/2020 | Ray .................. G01V 1/306 |
| 2013/0144532 A1* | 6/2013 | Williams .............. G01V 1/50 |
| | | 702/11 |
| 2014/0098632 A1 | 4/2014 | Lin et al. |
| 2015/0006082 A1 | 1/2015 | Zhang et al. |
| 2015/0055436 A1 | 2/2015 | Ma et al. |

* cited by examiner

STIMULATED FRACTURE NETWORK PARTITIONING FROM MICROSEISMICITY ANALYSIS

CROSS-REFERENCE TO RELATED APPLICATION

This application is the National Stage of, and therefore claims the benefit of, International Application No. PCT/US2015/061580 filed on Nov. 19, 2015, entitled "STIMULATED FRACTURE NETWORK PARTITIONING FROM MICROSEISMICITY ANALYSIS," which was published in English under International Publication Number WO 2017/086975 on May 26, 2017. The above application is commonly assigned with this National Stage application and is incorporated herein by reference in its entirety.

BACKGROUND

Unconventional reservoirs often have a low-permeability rock matrix that impedes fluid flows, making it difficult to extract hydrocarbons (or other fluids of interest) at commercially-feasible rates and volumes. Fortunately, the effective permeability of the formation can be increased by hydraulic fracturing. When the rock matrix is exposed to a high-pressure, high-volume flow of a relatively incompressible fluid, the low permeability causes sharp gradients in the formation's stress field, forcing integrity failures at the relatively weakest points of the rock matrix. Such failures often occur as sudden "cracking" or fracturing of the matrix that momentarily reduces the stress gradient until it can be rebuilt by the intruding fluid flow. As the high-pressure flow continues, the fractures may propagate, for example, as an intermittent series of small cracks, each crack yielding a small seismic shock ("a microseismic event"). Other such shocks may also be produced as the fluid deforms and shifts blocks of matrix material. Maps of such microseismic events have long been the basis for mapping out fracture networks and stimulated reservoir volume (SRV) regions.

To accurately analyze well performance and predict production from stimulated reservoirs, reservoir simulators require objective and realistic inputs. Such inputs include realistic models of hydraulic fracture networks and/or realistic geometries for the SRV regions. For multistage stimulation operations, however, the fracture network models and SRV region models from different stages may overlap in an unrealistic fashion, potentially causing portions of the reservoir to be counted twice by existing reservoir simulators.

BRIEF DESCRIPTION OF THE DRAWINGS

Accordingly, the drawings and the following description disclose systems and methods for efficiently partitioning multistage fracture networks and stimulated reservoir volume (SRV) regions into sub-networks and sub-regions that can be independently evaluated for each stage. The stage results can then be combined for a total evaluation and prediction. In the drawings.

It should be understood, however, that the specific embodiments given in the drawings and detailed description do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Figure 1:
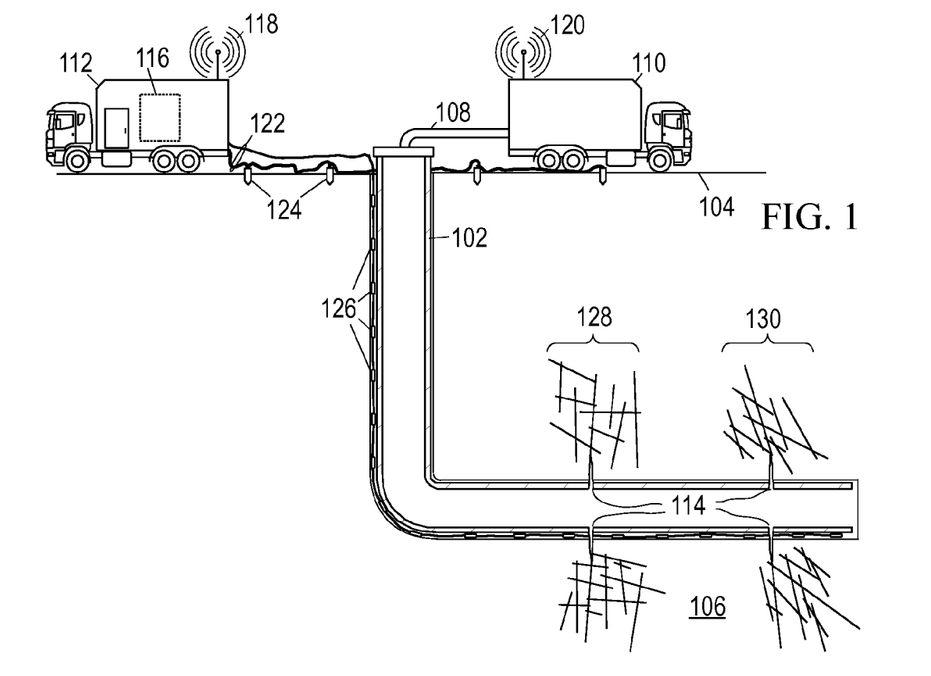
FIG. 1 is an environmental view of an illustrative hydraulic fracturing operation.

The disclosed partitioning systems and methods are best understood in context. We begin here with a discussion of an illustrative hydraulic fracturing operation to which the disclosed systems and methods may be applied. FIG. 1 shows the environment of an illustrative hydraulic fracturing operation. A wellbore 102 extends from the surface 104 into a subterranean region 106. Typically, the subterranean region includes a reservoir that contains hydrocarbons or other resources such as, e.g., oil. As another example, the subterranean region 106 may include all or part of a rock formation (e.g., shale, coal, sandstone, granite, or others) that contains natural gas. The subterranean region 106 may include naturally fractured rock or natural rock formations that are not fractured to any significant degree. When the subterranean region 106 includes tight gas formations (i.e., natural gas trapped in low permeability rock such as shale), it is typically desirable to create additional fractures in the formation to increase the formation's effective permeability.

Accordingly, FIG. 1 also shows an injection assembly coupled to supply a high-pressure, high-volume fluid flow via a conduit 108 to the wellbore 102. The injection assembly includes one or more pump trucks 110 and instrument trucks 112 that operate to inject fluid via the conduit 108 and the wellbore 102 into the subterranean region 106, thereby opening existing fractures and creating new fractures. The fluid reaches the formation via one or more fluid injection locations 114, which in many cases are perforations in the casing of wellbore 102. Such casing may be cemented to the wall of the wellbore 102, though this is not a requirement. In some implementations, all or a portion of the wellbore 102 may be left open, without casing. The conduit 108 may include an injection manifold and feed pipe, as well as piping internal to the wellbore such as a work string, coiled tubing, sectioned pipe, or other types of conduit.

The fracture treatment may employ a single injection of fluid to one or more fluid injection locations 114, or it may employ multiple such injections, optionally with different fluids. Where multiple fluid injection locations 114 are employed, they are typically, though not necessarily, stimulated in sequential stages. Moreover, they need not be located within the same wellbore 102, but may for example be distributed across multiple wells or multiple laterals within a well. An injection treatment control subsystem 116 coordinates operation of the injection assembly components (pump trucks, feed tanks, throttles, valves, flow sensors, pressure sensors, etc.) to monitor and control the fracture treatment. Though shown as being localized to a single instrument truck 112, the control subsystem 116 may in practice take the form of multiple data acquisition and processing subsystems optionally distributed throughout the injection assembly and wellbore 102, as well as remotely-coupled offsite computing facilities available via communication links and networks. Though the computing subsystem is described below as a separate entity for implementing hydraulic fracture modeling, some contemplated embodiments of the injection treatment control subsystem 116 have the simulator as an integrated component.

The pump trucks 110 can include mobile vehicles, immobile installations, skids, hoses, tubes, fluid tanks, fluid reservoirs, pumps, valves, mixers, or other types of structures and equipment. They supply treatment fluid and other materials (e.g., proppants, stop-loss materials) for the injection treatment. The illustrated pump trucks 110 communicate treatment fluids into the wellbore 102 at or near the level of the ground surface 104. The pump trucks 110 are coupled to valves and pump controls for starting, monitoring, stopping, increasing, decreasing or otherwise controlling pumping as well as controls for selecting or otherwise controlling fluids pumped during the injection treatment.

The instrument trucks 112 can include mobile vehicles, immobile installations, or other suitable structures and sensors for measuring temperatures, pressures, flow rates, and other treatment and production parameters. The example instrument trucks 112 shown in FIG. 1 include an injection treatment control subsystem 116 that controls or monitors the injection treatment applied by the injection assembly. The injection assembly may inject fluid into the formation above, at, or below a fracture initiation pressure; above, at, or below a fracture closure pressure; or at another fluid pressure.

Communication links 118, 120 enable the instrument trucks 112 to communicate with the pump trucks 110 and other equipment at the ground surface 104. Additional communication links 122 enable the instrument trucks 112 to communicate with sensors or data collection apparatus in the wellbore 102, other wellbores, remote facilities, and other devices and equipment. The communication links can include wired or wireless communications assemblies, or a combination thereof. FIG. 1 shows communication links 122 for an array of surface seismic sensors 124 and an array of downhole seismic sensors 126 for detecting and locating microseismic events. Though downhole sensors 126 are shown as being positioned in the injection well, they can also or alternatively be located in one or more nearby monitoring wells. Sensors 124 and/or 126 detect seismic energy from the microseismic events that occur as fractures are formed and propagated. The received energy signals from the sensors are processed by the control subsystem 116 to determine the microseismic event locations, times, magnitudes, moments, spectra, and the associated measurement uncertainties. Such information is indicative of the fracture locations and dimensions, which information may be used to determine when the fracturing operations should be terminated and how to carry out subsequent operations to achieve the desired results.

The injection treatment control subsystem 116 may include data processing equipment, communication equipment, and other equipment for monitoring and controlling injection treatments applied to the subterranean region 106 through the wellbore 102. The injection treatment control subsystem 116 may be communicably linked to a remote computing facility that can calculate, select, or optimize treatment parameters for initiating, opening, and propagating fractures of the desired extent. The injection treatment control subsystem 116 may receive, generate or modify an injection treatment plan (e.g., a pumping schedule) that specifies properties of an injection treatment to be applied to the subterranean region 106. Based on such modeled behavior results, the injection treatment control subsystem 116 shown in FIG. 1 controls operation of the injection assembly.

FIG. 1 shows that an injection treatment has fractured the subterranean region 106, producing a fracture network 130 for a first stage and a fracture network 128 for a second stage. The induced fractures may extend through naturally fractured rock, regions of unfractured rock, or both. The injected fracturing fluid can flow from the induced fractures into the natural fracture networks, into the rock matrix, or into other locations in the subterranean region 106 (e.g., faults, voids). The injected fracturing fluid can, in some instances, dilate or propagate the natural fractures or other pre-existing fractures in the rock formation. As discussed in the background section, the formation and propagation of fractures produces microseismic events, which may be identified and located based on analysis of the signals from sensors 124 and 126. Conventional processing techniques enable the location, time, and magnitude of each event to be determined.

Figure 2:
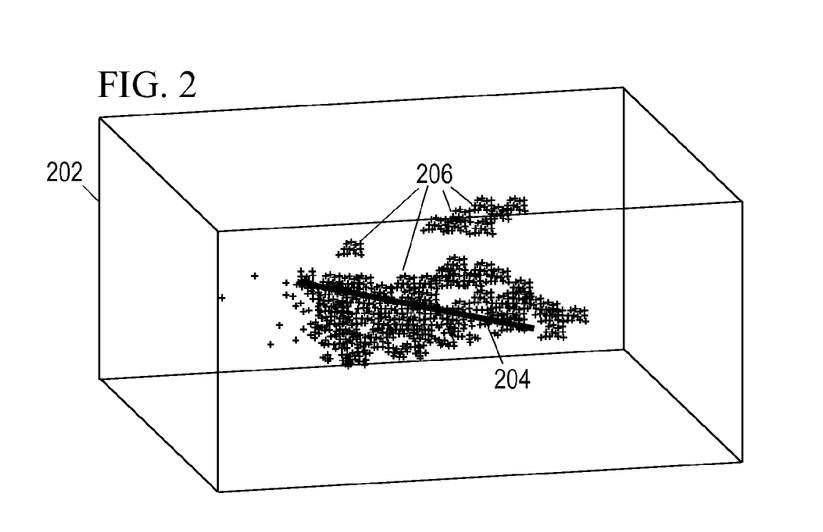
FIG. 2 is a map of an illustrative microseismic event distribution.

An illustrative microseismic event map is shown in FIG. 2. In the three dimensional model space 202, a solid line represents the wellbore trajectory 204. The location of each microseismic event 206 is represented by a "+" symbol, revealing the spatial distribution of the microseismic events 206. Though it may not be apparent from FIG. 2, the microseismic events cluster along fracture planes and the edges of the clusters propagate outward from the perforation point 114.

In some implementations, the control subsystem 116 collects and analyzes the signals from sensors 124, 126 to monitor fracture extents and to control the fluid injection parameters to promote closely spaced multiple fractures while maximizing the fractured volume of the reservoir. For example, the injection treatment control subsystem 116 can derive fracture network models from the microseismic event map and use such models to predict the volume, rate, and efficiency of hydrocarbon production. These predictions may serve as a basis for modifying, updating, or generating a fracture treatment plan (pumping rates, pressures, fluid compositions) for an ongoing or future treatment.

Some of the techniques and operations described herein may be implemented by one or more computing systems configured to provide the functionality described. In various instances, a computing system may include any of various types of devices, including, but not limited to, handheld mobile devices, tablets, notebooks, laptops, desktop computers, workstations, mainframes, distributed computing networks, and virtual (cloud) computers.

Figure 3:
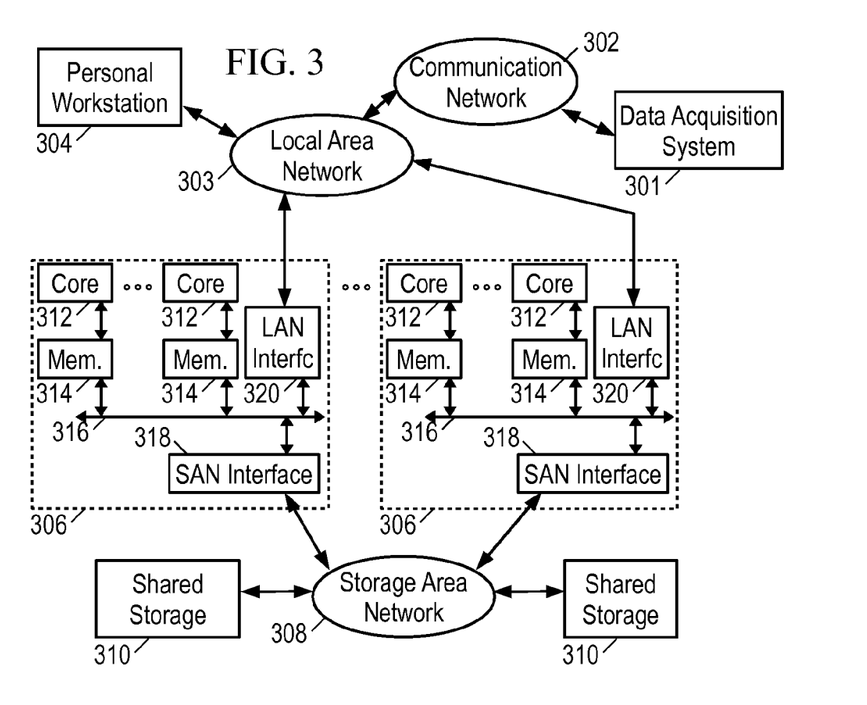
FIG. 3 is a block diagram of an illustrative hydraulic fracture modeling system.

FIG. 3 shows an illustrative computing system in which a data acquisition system 301 represents the instrument trucks 112 and other sources of data regarding the well and surrounding formations. A communications network 302 (such as, e.g., the internet or other communications link for transferring digital data) couples the data acquisition system 301 to a local area network (LAN) 303 to communicate the data to a personal workstation 304. The data can include treatment data, geological data, fracture data, fluid data, or other types of data. Workstation 304 may take the form of a desktop computer having a user interface (e.g., keyboard, mouse, and display) that enables the user to interact with the other elements of the computing subsystem, e.g., by entering commands and viewing responses. In this fashion, the user is able to retrieve the collected data and make it available for deriving a fracture network model, determining a stimulated reservoir volume (SRV) region, and simulating reservoir behavior to predict hydrocarbon production parameters.

Workstation 304 may lack sufficient internal resources to perform such processing in a timely fashion. The LAN 303 further couples the workstation 304 to one or more multi-processor computers 306, which are in turn coupled via a storage area network (SAN) 308 to one or more shared storage units 310. LAN 304 provides high-speed communication between multi-processor computers 306 and with personal workstation 304. The LAN 304 may take the form of an Ethernet network.

Multi-processor computer(s) 306 provide parallel processing capability to enable suitably prompt processing of the microseismic and fracture growth modeling data. Each computer 306 includes multiple processors 312, distributed memory 314, an internal bus 316, a SAN interface 318, and a LAN interface 320. Each processor 312 operates on allocated tasks to solve a portion of the overall problem and contribute to at least a portion of the overall results. Associated with each processor 312 is a distributed memory module 314 that stores application software and a working data set for the processor's use. Internal bus 316 provides inter-processor communication and communication to the SAN or LAN networks via the corresponding interfaces 318, 320. Communication between processors in different computers 306 can be provided by LAN 304 or via a mailbox mechanism on storage devices 310.

SAN 308 provides low-latency access to shared storage devices 310. The SAN 308 may take the form of, e.g., a Fibrechannel or Infiniband network. Shared storage units 310 may be large, stand-alone information storage units that employ magnetic disk media for nonvolatile data storage. Other suitable forms of nontransitory information storage media can also be employed. To improve data access speed and reliability, the shared storage units 310 may be configured as a redundant disk array ("RAID").

It is the software that configures the various parts of the computing system to coordinate and collectively operate as a hydraulic fracture network modeling and reservoir simulation system. One or more commercially available software packages and libraries may be installed in the computer assembly to provide the functionality for solving linear systems. User-authored programs, functions, scripts, workflows, or other programming mechanisms may be employed to customize the operation of the software and automate certain operations such as those outlined below for extracting microseismic events from sensor signals, fitting fracture planes to microseismic events, determining SRV regions, and simulating reservoir drainage. The applications software may include a seismic signal processing module, a hydraulic fracture plane fitting module, an SRV region estimating module, a stage partitioning module, a drainage simulation modules, a user interface module, and other function modules, each implemented in the form of machine-readable instructions. Examples of commercially available software that support the use of such programming include C, C++, C++ AMP, D, Erlang, Fortran, and Python. The computing system can be pre-programmed or can be programmed (and reprogrammed) as needed by loading a program from another source (e.g., from a CD-ROM, from another computer device through a data network, or in another manner). Nevertheless, the implementation of the following methods is not limited to any specific software language or execution environment.

Figure 4:
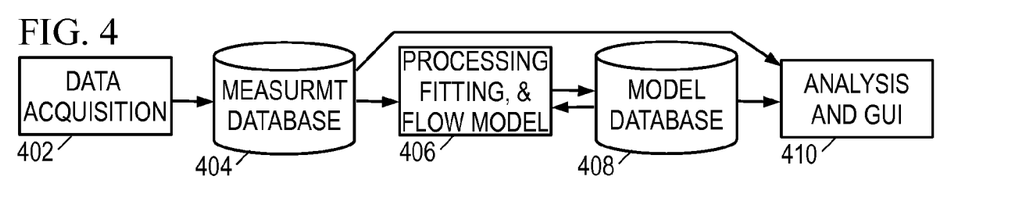
FIG. 4 is a diagram of an illustrative modeling software architecture.

The software operating on the computing system may be structured as indicated by the software architecture shown in FIG. 4. A data acquisition module 402 stores various types of data in a measurement database 404. The measurement database may include treatment data relating to injection treatment plans. For example the treatment data can indicate parameters of an ongoing treatment, parameters of a previous injection treatment, or parameters of a proposed injection treatment. Such parameters may include information on flow rates, flow volumes, slurry concentrations, fluid compositions, injection locations, injection pressures, injection times, shut-in times, and other parameters.

The measurement database may further include geological data relating to geological properties of a subterranean region. For example, the geological data may include information on wellbores, completions, or information on other attributes of the subterranean region. In some cases, the geological data includes information on the lithology, fluid content, stress profile (e.g., stress anisotropy, maximum and minimum horizontal stresses), pressure profile, spatial extent, or other attributes of one or more rock formations in the subterranean zone. The geological data can include information collected from well logs, rock samples, outcroppings, microseismic imaging, or other data sources.

The measurement database may still further include fluid data relating to well fluids and entrained materials. The fluid data may identify types of fluids, fluid properties, thermodynamic conditions, and other information related to fluid behaviors downhole. The fluid data can include flow models for compressible or incompressible fluid flow. For example, the fluid data can include coefficients for systems of governing equations (e.g., Navier-Stokes equations, advection-diffusion equations, continuity equations, etc.) that represent fluid flow generally or fluid flow under certain types of conditions. In some cases, the governing flow equations define a nonlinear system of equations. The fluid data can include data related to native fluids that naturally reside in a subterranean region, treatment fluids to be injected into the subterranean region, and hydraulic fluids that operate well assembly tools.

The measurement database may yet still further include seismic sensor data and/or extracted microseismic event data. The seismic processing, fracture plane fitting, SRV region estimation, and stage partitioning modules 406 may employ the information from the measurement database 404 to locate and model the induced and stimulated fracture networks for each stage. The fracture network models are stored in model database 408. The fracture network models may include fracture plane orientations and locations calculated from microseismic data, with fracture strike angles, dip angles, apertures, heights, and boundaries, and may further include SRV regions derived from the network models. The drainage simulation module (included in module set 406) may simulate reservoir drainage using the fracture network models from model database 408 in combination with formation information from measurement database 404 to estimate production rates, volumes, and efficiencies.

A visualization and analysis module 410 generates visual representations of the fracture planes and measurements for an operator, generally in an interactive form that enables the operator to enhance portions of the model and direct the drainage simulation module and other function modules to derive analytical results therefrom. The visual representation may depict spatial distributions of values and/or integrated values such as injected volumes, flow rates, fracture dimensions, and estimated permeabilities. In some contemplated embodiments, the analysis module further produces recommendations for real-time modifications to treatment plans that are underway.

The computing system analyzes the microseismic event map to extract the hydraulic fracture geometries using, e.g., optimal computational matching methodologies such as those set forth in Jianfu Ma and Ken Williams, "Systems and Methods for Hydraulic Fracture Characterization Using Microseismic Event Data", WIPO Pub. No: WO/2012/141720 A1; Jianfu Ma, Avi Lin and Harold Walters, "Analyzing Microseismic Data from a Fracture Treatment", WIPO Pub. No: WO/2014/055931 A1; and Jianfu Ma and Avi Lin, "Identifying Fracture Planes from Microseismic Data", US Pub. No: US 2014/0098638 A1. From the resulting network of fracture planes, the computing system derives an SRV region. One suitable approach is disclosed in Jianfu Ma and Avi Lin, "Enhancing Reservoir Characterization Using Real-time SRV and Fracture Evolution Parameters", Application No. PCT/US2014/39390.

Figure 5A:
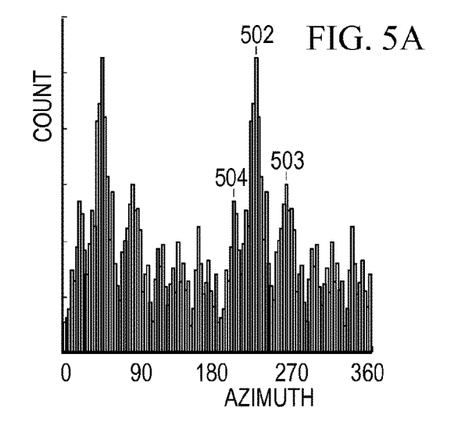
FIG. 5A is a histogram of fracture orientations.

As part of fitting a set of fracture planes to the microseismic event map, the referenced methods employ a histogram technique. Recognizing that only three (non-collinear) points are needed to determine the position and orientation of a plane, the referenced methods take every possible combination of three microseismic events from the map and determine the orientation (azimuth and dip) of the corresponding plane. A histogram of the orientation angles (such as the azimuth histogram shown in FIG. 5A) reveals peaks 502-504 at the predominant fracture orientations. (An ambiguity of 180° causes the second half of the histogram to duplicate the first half) The strongest peak 502 corresponds to the primary (dominant) family of fracture planes, while lesser peaks 503-504 correspond to secondary families of fracture planes.

Figure 5B:
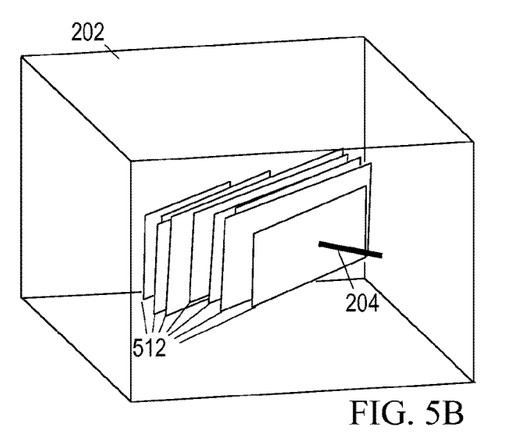
FIG. 5B is a map of illustrative fracture planes.

Taking each peak in turn, the referenced methods determine optimal locations for the fracture planes associated with the events that contributed to that peak, as well as the optimal length, height, area, and orientation of each plane. FIG. 5B shows a representative set of fracture planes 512 for the primary family.

Figure 5C:
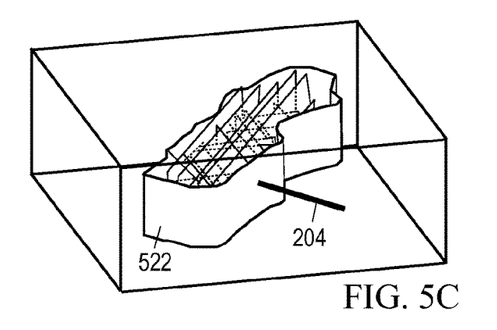
FIG. 5C is a map of a single-stage SRV region.

Once the secondary families have also been optimally located, the referenced methods determine the stimulated reservoir volume (SRV) region 522. FIG. 5C shows an illustrative SRV region 522 for a first stage of a fracturing operation. The region boundary defines the boundary of the hydraulic fracture network and acts as the interface between the stimulated fracture network and the unfractured reservoir. The SRV region and fracture plane model of to the stimulated fracture network provide the detailed information needed for reservoir simulation to estimate the hydrocarbon productivity of stimulated reservoirs.

Figure 5D:
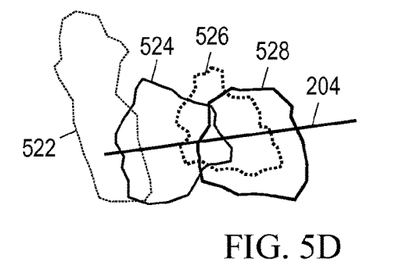
FIG. 5D is a view of overlapping SRV regions from multiple stages.

As previously mentioned, the hydraulic fracturing operation may be performed in sequential stages, with the injections and measurements for each stage being completed before the next begins. The microseismic events for each stage may be separately mapped and fitted with a network of fracture planes from which a corresponding SRV region is derived. FIG. 5D shows an illustrative sequence of SRV regions 522-528, with region 522 corresponding to a first stage, region 524 corresponding to a second stage, region 526 corresponding to a third stage, and region 528 corresponding to a fourth stage.

Notably, the regions 522-528 overlap, creating a continuous SRV region and fracture network extending along the borehole 204. Such overlap is normally a deliberate design choice to optimize reservoir coverage, yet the size of this continuous region poses severe challenges to reservoir simulators. Accordingly, the present disclosure provides a method for partitioning the continuous region into sub-regions while accounting for the overlap between the associated fracture networks. Such partitioned fracture networks have been found to yield superior predictions by the reservoir simulators.

Figure 6:
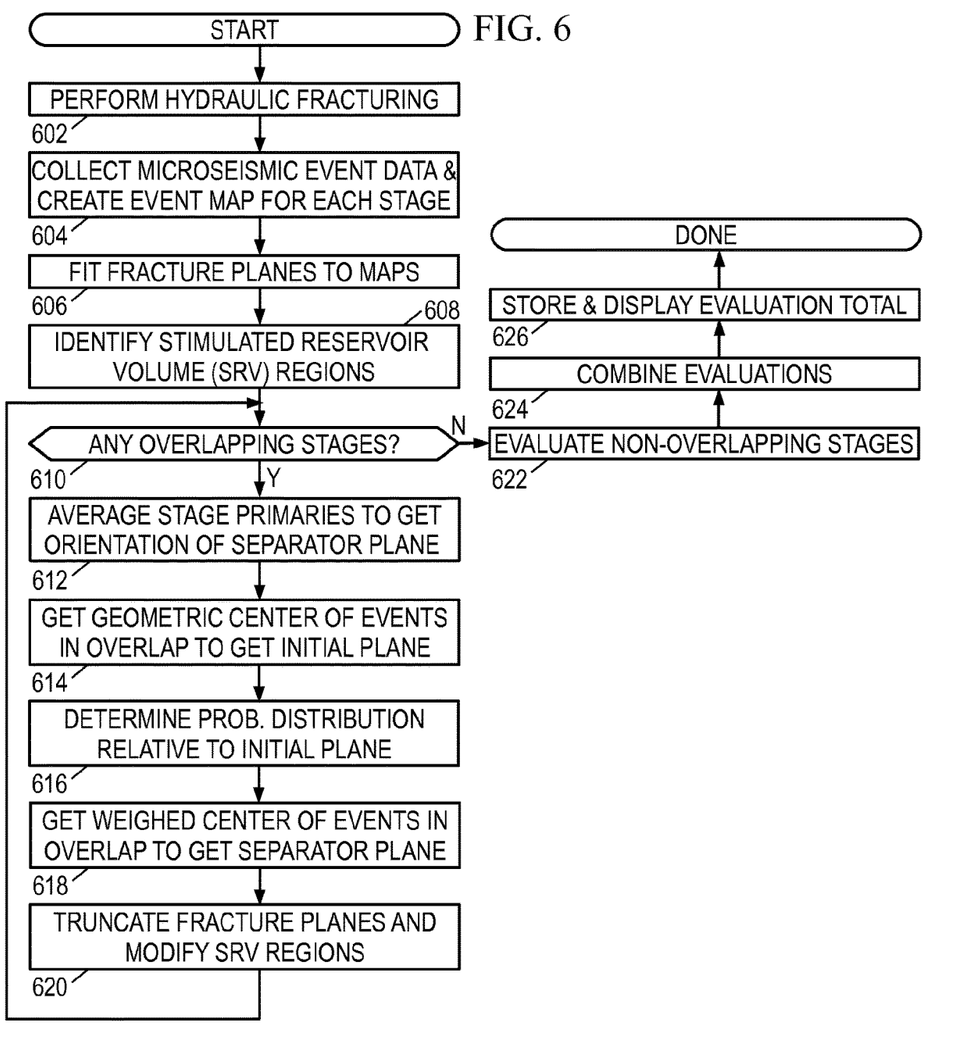
FIG. 6 is a view of an overlap with a separator plane.

Accordingly, FIG. 6 presents an illustrative hydraulic fracture modeling and reservoir simulation method that employs partitioning of overlapping fracture networks. The bulk of the method may be implemented by the above-described computing systems. Though the operations of the method in FIG. 6 are shown and described as being sequential, in practice many of the operations are expected to occur concurrently and with potentially different orders.

The method begins in block 602 with a crew performing a hydraulic fracturing operation. Such operations normally occur in accordance with a predetermined pumping schedule that specifies a sequence of fluid compositions along with volumes, pumping rates, and injection pressures, for each stage though various parameters can be and are expected to be varied as circumstances require.

In block 604, the computing system obtains microseismic signals and determines the location and other parameters of each microseismic event, creating a microseismic event map for each stage. Each microseismic event location is specified with a 3D Cartesian coordinate (x,y,z), an occurrence time t, a moment magnitude M, and a location uncertainty specified in terms of estimated standard deviations ($\sigma_x$, $\sigma_y$, $\sigma_z$) along each coordinate axis.

In block 606, the computing system fits fracture planes to each of the microseismic event maps, optionally using the "Identifying Fracture Planes" method referenced above, thereby deriving a fracture network for each stage. In block 608, the computing system identifies the SRV region from the fracture network for each stage optionally using the "Enhancing Reservoir Characterization" method referenced above.

Blocks 610-620 form a loop that iterates through each overlapping pair of stages. In at least some embodiments, adjacent stages are evaluated for overlap and partitioning before non-adjacent stages are checked for overlap. (Thus, with reference to FIG. 5D, the overlaps of regions 522 and 524; regions 524 and 526; and regions 526 and 528, are evaluated and resolved before the overlap of regions 524 and 528.)

After each of the overlaps has been resolved, the method proceeds to block 622, where the computing system performs reservoir simulation for the combined fracture network and SRV. The simulation employs the fracture network and SRV region for the given stage along with the relevant measurements of formation porosity, permeability, saturation, and other parameters. The results of the simulation may include a hydrocarbon production rate, production volume, production efficiency, and such other parameters that are deemed useful. In block 624, the computing system obtains overall results on basis of the combined system for the stimulated region of the formation. In block 626, the computing system stores the overall evaluation results, and may further display a visual representation of the results for analysis by the field engineers.

Figure 7:
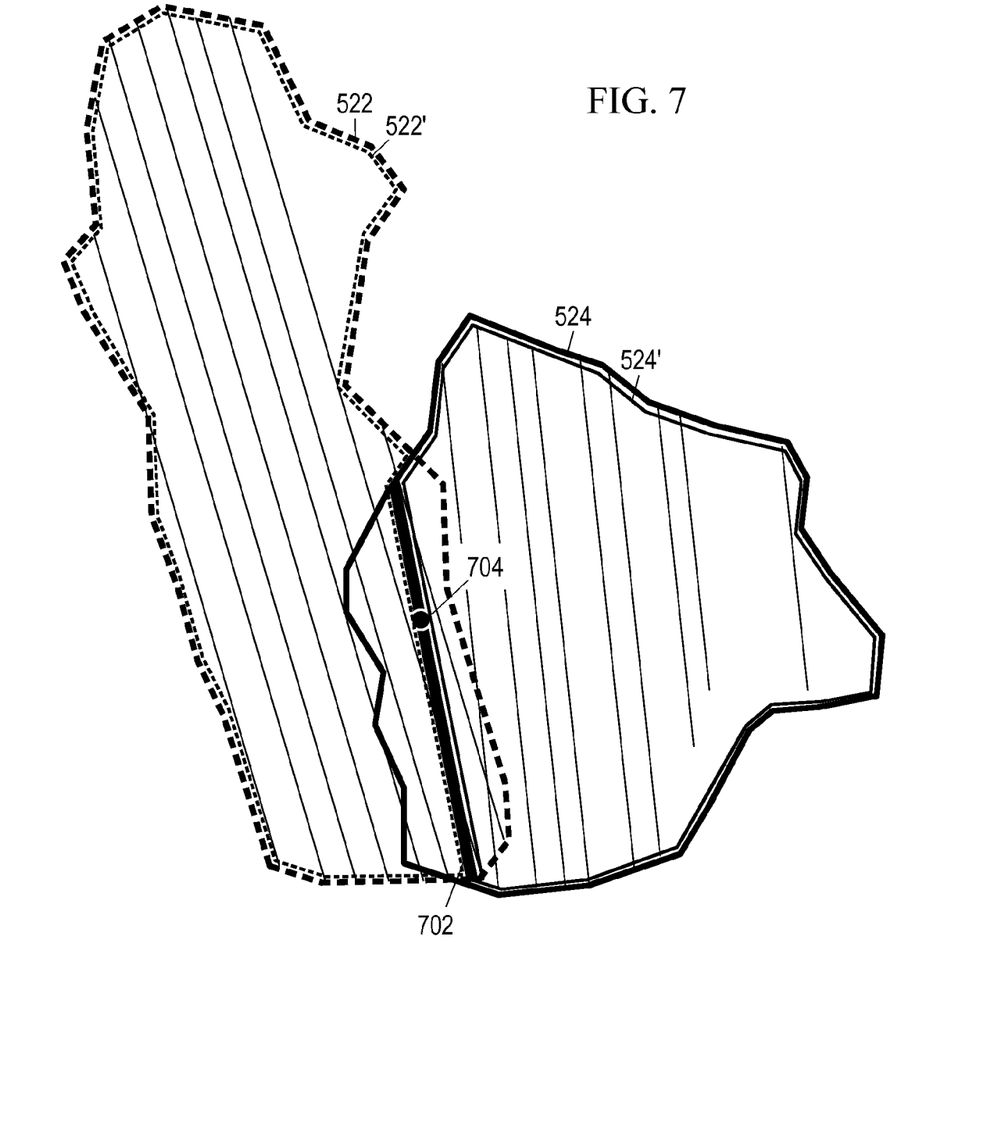
FIG. 7 is a flow diagram of an illustrative SRV region partitioning method.

To resolve each of the overlaps, the computer system identifies a pair of overlapping SRV regions in block 610. In block 612, the orientations of the dominant fractures in two overlapping stages (i.e., the primary fracture family) are averaged to determine the orientation of the separator plane. If we denote the overlapping regions as Stage 1 and Stage 2, the strike and dip angles for the primary fracture family of Stage 1 are ($\varphi_1$, $\theta_1$) respectively and for the primary fracture family of Stage 2 are ($\varphi_2$, $\theta_2$). The ideal orientation of the separator plane is $$\varphi = \frac{\varphi_1 + \varphi_2}{2}, \quad (1a)$$

$$\theta = \frac{\theta_1 + \theta_2}{2} \quad (1b)$$

enabling the separator plane to be expressed as $$(x-x_0)\cos\varphi\sin\theta + (y-y_0)\sin\varphi\sin\theta + (z-z_0)\cos\theta = 0 \quad (2)$$

where $(x_0, y_0, z_0)$ is a point on the plane that serves as an origin. FIG. 7 shows an example of Stage 1 SRV region 522 having primary fracture family planes oriented with an azimuth (strike) angle of 106° and a Stage 2 SRV region 524 having primary fracture family planes oriented with a strike angle of 96°. The separator plane 702 is accordingly assigned an average strike angle of 101°. An origin 704 determines the location of the separator plane 702.

In block 614, the computing system determines an initial origin and thereby determines an initial position for the separator plane 702 by averaging the coordinates of the events within the overlap between the two SRV regions.

$$x_0 = \frac{1}{n}\sum_{i=1}^{n} x_i, \; y_0 = \frac{1}{n}\sum_{i=1}^{n} y_i, \; z_0 = \frac{1}{n}\sum_{i=1}^{n} z_i \quad (3)$$

where n is the number of microseismic events in the overlap region.

In block 616 the computing system determines a probability distribution of the microseismic events within the overlap region, relative to the initial position of the separator plane 702. The distance of each microseimic event location $(x_i, y_1, z_i)$ within the overlap region relative to the initial separator plane is $$d_i = (x_i - x_0)\cos\varphi\sin\theta + (y_i - y_0)\sin\varphi\sin\theta + (z_i - z_0)\cos\theta \quad (4)$$

We note that the distance is signed; events with all positive distances are on one side of the separator plane, while events with all negative distance values are on the opposite side. A normalized histogram of the calculated distances serves as the probability distribution, yielding a probability $p_i = P(d_i)$.

In block 618, the computing system determines a refined origin position, using a weighted sum of the microseismic event coordinates:

$$x_0 = \left(\sum_{i=1}^{n} p_i \frac{10^{(4.8+1.5M_i)-1}}{\sigma_x^{(i)}\sigma_y^{(i)}\sigma_z^{(i)}}\right)^{-1} \sum_{i=1}^{n} x_i p_i \frac{10^{(4.8+1.5M_i)}}{\sigma_x^{(i)}\sigma_y^{(i)}\sigma_z^{(i)}}, \quad (5a)$$

$$y_0 = \left(\sum_{i=1}^{n} p_i \frac{10^{(4.8+1.5M_i)-1}}{\sigma_x^{(i)}\sigma_y^{(i)}\sigma_z^{(i)}}\right)^{-1} \sum_{i=1}^{n} y_i p_i \frac{10^{(4.8+1.5M_i)}}{\sigma_x^{(i)}\sigma_y^{(i)}\sigma_z^{(i)}}, \quad (5b)$$

$$z_0 = \left(\sum_{i=1}^{n} p_i \frac{10^{(4.8+1.5M_i)-1}}{\sigma_x^{(i)}\sigma_y^{(i)}\sigma_z^{(i)}}\right)^{-1} \sum_{i=1}^{n} z_i p_i \frac{10^{(4.8+1.5M_i)}}{\sigma_x^{(i)}\sigma_y^{(i)}\sigma_z^{(i)}} \quad (5c)$$

where $\sigma_x^{(i)}$, $\sigma_y^{(i)}$, $\sigma_z^{(i)}$ are standard deviations representing the event's location measurement uncertainty along each coordinate axis (with their product representing a measurement uncertainty volume), and where $M_i$ is the moment of microseismic event i and is related to that event's seismic energy by the expression $$E_i = 10^{(4.8+1.5M_i)} \quad (6)$$

Thus the weighting factors include the event's distance probability, position uncertainty and seismic energy. The refined origin position determines the optimal position of the separator plane 702.

In block 620, the computing system partitions the overlap region using the separator plane, re-determining the SRV regions using the separator plane as part of the boundaries for each stage. In FIG. 7, region 522 becomes region 522' and region 524 becomes region 524'. The fracture networks for each stage are then constrained to lie within the revised SRV region boundaries. Any Stage 1 fractures outside the Stage 1 SRV region 522' are discarded. If a Stage 1 fracture crosses the separator plane 702, it is truncated at the separator plane. In some embodiments, all of the Stage 1 fractures that lie fully within the Stage 1 SRV region 522' are preserved. In certain alternative embodiments, Stage 1 fractures that become disconnected from the borehole due to the truncation or elimination of other Stage 1 fractures are also discarded. The same process is applied to Stage 2 fractures wholly or partially located outside the Stage 2 SRV region 524'.

After block 620 is complete, the identified overlap is eliminated. Blocks 610-620 are then repeated for subsequent stages. The non-overlapping fracture networks and SRV regions then become input data to unconventional reservoir simulation for hydrocarbon production prediction. Suitable reservoir simulation methods are provided in the literature, including Shahab Mohaghegh, "A Critical View of Current State of Reservoir Modeling of Shale Assets", SPE 165713, the SPE Eastern Regional Meeting, Pittsburgh, 20-22 Aug. 2013; and David Quirk, Ali S. Ziarani, Kevin Wager and Cheney Chen, "Integration of Microseismic Data, Fracture and Reservoir Simulation into the Development of Fractures Horizontal Wells in the Cardium Formation—A Tight Oil Case Study", SPE 160002, the SPE Annual Technical Conference and Exhibition, San Antonio, Oct. 8-10, 2011.

In summary, the embodiments disclosed herein include:

A: A hydraulic fracture mapping method that comprises: collecting microseismic signals during a multistage hydraulic fracturing operation; deriving microseismic event locations from the microseismic signals to create a microseismic event map for each stage of the multistage hydraulic fracturing operation; fitting a set of fracture planes to the microseismic event map for each stage; determining a stimulated reservoir volume region, hereafter "SRV region", for each said stage; identifying where a first and second of said SRV regions overlap to form an overlap region; partitioning the overlap region to eliminate any overlap between the first and second of said SRV regions, thereby obtaining first and second revised SRV regions; truncating the set of fracture planes for the first of said SRV regions to discard any portion outside the first revised SRV region; truncating the set of fracture planes for the second of said SRV regions to discard any portion outside the second revised SRV region; and storing or displaying the truncated set of fracture planes for the first revised SRV region.

B: A hydraulic fracture mapping system that comprises: a data acquisition module collecting microseismic signals from a subterranean formation undergoing a multistage hydraulic fracturing operation; a processing module implementing a mapping method, and a non-transient information storage medium storing a truncated set of fracture planes for a first revised SRV region. The method includes: deriving microseismic event locations from the microseismic signals to create a microseismic event map for each stage of the multistage hydraulic fracturing operation; fitting a set of fracture planes to the microseismic event map for each stage; determining a stimulated reservoir volume region, hereafter "SRV region", for each said stage; identifying where a first and second of said SRV regions overlap to form an overlap region; partitioning the overlap region to eliminate any overlap between the first and second of said SRV regions, thereby obtaining first and second revised SRV regions; truncating the set of fracture planes for the first of said SRV regions to discard any portion outside the first revised SRV region; and truncating the set of fracture planes for the second of said SRV regions to discard any portion outside the second revised SRV region.

Each of the embodiments A and B, may further include one or more of the following additional features in any combination: (1) the partitioning includes setting an orientation and position of a separator plane across the overlap region. (2) setting the orientation of the separator plane includes: finding a first strike angle and a first dip angle from a primary fracture family in the first of said SRV regions; finding a second strike angle and a second dip angle from a primary fracture family in the second of said SRV regions; setting a separator plane strike angle to an average of the first and second strike angles; and setting a separator plane dip angle to an average of the first and second dip angles. (3) setting the position of the separator plane includes: averaging locations of all microseismic events in the overlap region to obtain an initial position for the separator plane. (4) setting the position of the separator plane further includes: determining a probability distribution for distances of the microseismic events in the overlap region from the separator plane at the initial position. (5) setting the position of the separator plane still further includes: calculating a weighted sum of the locations of the microseismic events in the overlap region to obtain a refined position for the separator plane, the weighted sum using the probability distribution as a weighting factor. (6) the weighted sum further uses a measurement uncertainty volume for each microseismic event as a weighting factor. (7) the weighted sum further uses a seismic energy for each microseismic event as a weighting factor. (8) said truncating of the fracture planes for the first of said SRV regions includes discarding any portion of a fracture plane in the set that is outside the revised SRV region, and further includes eliminating any fracture plane that becomes disconnected from a borehole due to said discarding. (9) The method further comprises: simulating the reservoir production from revised SRV regions; and combining simulation results to predict hydrocarbon production from said SRV regions for all stages.

Numerous variations and modifications will become apparent to those skilled in the art once the above disclosure is fully appreciated. The ensuing claims are intended to cover such variations where applicable.

What is claimed is:

1. A hydraulic fracture mapping method that comprises:
   collecting microseismic signals during a multistage hydraulic fracturing operation;
   deriving microseismic event locations from the microseismic signals to create a microseismic event map for each stage of the multistage hydraulic fracturing operation;
   fitting a set of fracture planes to the microseismic event map for each stage;
   determining a stimulated reservoir volume region, hereafter "SRV region", for each said stage;
   identifying where a first and second of said SRV regions overlap to form an overlap region;
   partitioning the overlap region to eliminate any overlap between the first and second of said SRV regions, thereby obtaining first and second revised SRV regions;
   truncating the set of fracture planes for the first of said SRV regions to discard any portion outside the first revised SRV region;
   truncating the set of fracture planes for the second of said SRV regions to discard any portion outside the second revised SRV region; and
   storing or displaying the truncated set of fracture planes for the first revised SRV region.

2. The method of claim 1, wherein the partitioning includes setting an orientation and position of a separator plane across the overlap region.

3. The method of claim 2, wherein setting the orientation of the separator plane includes:
   finding a first strike angle and a first dip angle from a primary fracture family in the first of said SRV regions;
   finding a second strike angle and a second dip angle from a primary fracture family in the second of said SRV regions;
   setting a separator plane strike angle to an average of the first and second strike angles; and
   setting a separator plane dip angle to an average of the first and second dip angles.

4. The method of claim 2, wherein setting the position of the separator plane includes:
   averaging locations of all microseismic events in the overlap region to obtain an initial position for the separator plane.

5. The method of claim 4, wherein setting the position of the separator plane further includes:
   determining a probability distribution for distances of the microseismic events in the overlap region from the separator plane at the initial position.

6. The method of claim 5, wherein setting the position of the separator plane still further includes:
   calculating a weighted sum of the locations of the microseismic events in the overlap region to obtain a refined position for the separator plane, the weighted sum using the probability distribution as a weighting factor.

7. The method of claim 6, wherein the weighted sum further uses a measurement uncertainty volume for each microseismic event as a weighting factor.

8. The method of claim 6, wherein the weighted sum further uses a seismic energy for each microseismic event as a weighting factor.

9. The method of claim 1, wherein said truncating of the fracture planes for the first of said SRV regions includes discarding any portion of a fracture plane in the set that is outside the revised SRV region, and further includes eliminating any fracture plane that becomes disconnected from a borehole due to said discarding.

10. The method of claim 1, further comprising:
    simulating reservoir flow from revised SRV regions; and
    combining simulation results to predict hydrocarbon production from said SRV regions for all stages.

11. A hydraulic fracture mapping system that comprises:
    a data acquisition module collecting microseismic signals from a subterranean formation undergoing a multistage hydraulic fracturing operation;
    a processing module implementing a mapping method that includes:
       deriving microseismic event locations from the microseismic signals to create a microseismic event map for each stage of the multistage hydraulic fracturing operation;

fitting a set of fracture planes to the microseismic event map for each stage;
determining a stimulated reservoir volume region, hereafter "SRV region", for each said stage;
identifying where a first and second of said SRV regions overlap to form an overlap region;
partitioning the overlap region to eliminate any overlap between the first and second of said SRV regions, thereby obtaining first and second revised SRV regions;
truncating the set of fracture planes for the first of said SRV regions to discard any portion outside the first revised SRV region; and
truncating the set of fracture planes for the second of said SRV regions to discard any portion outside the second revised SRV region; and
a non-transient information storage medium storing the truncated set of fracture planes for the first revised SRV region.

12. The system of claim 11, wherein the partitioning includes setting an orientation and position of a separator plane across the overlap region.

13. The system of claim 12, wherein setting the orientation of the separator plane includes:
finding a first strike angle and a first dip angle from a primary fracture family in the first of said SRV regions;
finding a second strike angle and a second dip angle from a primary fracture family in the second of said SRV regions;
setting a separator plane strike angle to an average of the first and second strike angles; and
setting a separator plane dip angle to an average of the first and second dip angles.

14. The system of claim 12, wherein setting the position of the separator plane includes:
averaging locations of all microseismic events in the overlap region to obtain an initial position for the separator plane.

15. The system of claim 14, wherein setting the position of the separator plane further includes:
determining a probability distribution for distances of the microseismic events in the overlap region from the separator plane at the initial position.

16. The system of claim 15, wherein setting the position of the separator plane still further includes:
calculating a weighted sum of the locations of the microseismic events in the overlap region to obtain a refined position for the separator plane, the weighted sum using the probability distribution as a weighting factor.

17. The system of claim 16, wherein the weighted sum further uses a measurement uncertainty volume for each microseismic event as a weighting factor.

18. The system of claim 16, wherein the weighted sum further uses a seismic energy for each microseismic event as a weighting factor.

19. The system of claim 11, wherein said truncating of the fracture planes for the first of said SRV regions includes discarding any portion of a fracture plane in the set that is outside the revised SRV region, and further includes eliminating any fracture plane that becomes disconnected from a borehole due to said discarding.

20. The system of claim 11, wherein the method further comprises:
simulating reservoir flow from revised SRV regions; and
combining simulation results to predict hydrocarbon production from said SRV regions for all stages.

* * * * *